United States Patent [19]
Sakata et al.

[11] Patent Number: 6,018,956
[45] Date of Patent: Feb. 1, 2000

[54] TEMPERATURE CONTROLLING PSEUDO LOAD CONTAINER FOR INSULATED COLD CABINET AND METHOD FOR ARRANGING PSEUDO LOAD CONTAINER IN INSULATED COLD CABINET

[75] Inventors: Yasushi Sakata; Takashi Arai, both of Osaka-fu, Japan

[73] Assignee: Sanyo Electric Co., Ltd., Osaka-fu, Japan

[21] Appl. No.: 09/225,962

[22] Filed: Jan. 6, 1999

[30] Foreign Application Priority Data

Jan. 7, 1998 [JP] Japan .................................. 10-001742

[51] Int. Cl.[7] ...................................................... F25D 11/00
[52] U.S. Cl. .............................. 62/126; 62/228.1; 62/130; 220/694
[58] Field of Search ............................... 62/125, 126, 127, 62/129, 130, 229, 228.1; 165/11.1; 220/592.01, 592.16, 592.17, 694; 236/94, 15 BB; 374/141, 149, 150, 155; 340/584, 585, 588

[56] References Cited

U.S. PATENT DOCUMENTS

| | | | |
|---|---|---|---|
| 2,741,099 | 4/1956 | Beane | ......................................... 62/126 |
| 3,100,383 | 8/1963 | Foster et al. | ............................... 62/126 |
| 3,343,151 | 9/1967 | Brown et al. | ......................... 62/126 X |
| 4,184,340 | 1/1980 | Laughlin et al. | ......................... 62/129 |

*Primary Examiner*—Harry B. Tanner
*Attorney, Agent, or Firm*—Weingarten, Schurgin, Gagnebin & Hayes LLP

[57] ABSTRACT

A temperature controlling pseudo load container for an insulated cold cabinet is provided in which the pseudo load container contains water or physiological saline and comprises at least one sealable opening portion for pouring water or physiological saline into the container and sensor arranging portions in which a temperature controlling sensor, and preferably a temperature recording sensor in addition, can be mounted closely to an external wall of the container and kept out of direct touch with the cold air in the insulated cold cabinet.

12 Claims, 4 Drawing Sheets

TEMPERATURE CONTROLLING PSEUDO LOAD CONTAINER FOR INSULATED COLD CABINET AND METHOD FOR ARRANGING PSEUDO LOAD CONTAINER IN INSULATED COLD CABINET

BACKGROUND OF THE INVENTION

1. Field of the Invention

The present invention relates to a temperature controlling pseudo load container for an insulated cold cabinet such as a blood insulated cold cabinet, medicine insulated cold cabinet and food insulated cold cabinet, to an insulated cold cabinet comprising a pseudo load container, and to a method for arranging a pseudo load container in an insulated cold cabinet.

2. Description of the Related Art

In controlling the inside temperatures of an insulated cold cabinet such as a blood insulated cold cabinet, a medicine insulated cold cabinet and a food insulated cold cabinet, it is common to sense and control the air temperature in the insulated cold cabinet. However, it is difficult to control load temperatures since the air temperature differs from the load temperatures of actual blood, medicine, food, and the like. Particularly in the case of blood preservation, such methods in which temperature control is performed by sensing the air temperature in the cabinet are ineligible in view of the international standards on the preservation of blood (AABB, DIN, and so on).

Conventionally, in order to meet the international standards, temperature control is performed with a temperature sensor directly inserted into a container containing water or physiological saline. However, the direct insert of the temperature sensor causes damage to the sensor. This gives rise to a problem in that protective equipment, heat conductive mediums, sealing materials, and the like are required to protect the sensor, along with a problem of complicated structures and higher costs.

SUMMARY OF THE INVENTION

An object of the present invention is to provide: a temperature controlling pseudo load container for an insulated cold cabinet, in which the inside temperature of the insulated cold cabinet can be controlled to agree with the load temperature of actual blood, medicine, food, and the like; to provide an insulated cold cabinet comprising the pseudo load container; and to provide a method for arranging the pseudo load container in the insulated cold cabinet, being capable of solving the above-described problems and meeting the aforesaid international standards.

A first aspect of the present invention for attaining the object is to provide a temperature controlling pseudo load container for an insulated cold cabinet, in which the temperature controlling pseudo load container is arranged in the insulated cold cabinet for controlling the inside temperature thereof and contains water or physiological saline, and in which the temperature controlling pseudo load container comprises an opening portion for pouring water or physiological saline, the opening portion being sealable, and an arranging portion for arranging a sensor, the arranging portion being capable of mounting the sensor adjacently to an external wall of the container and preventing the sensor from direct touching with cold air in the cabinet.

A second aspect of the present invention is to provide the temperature controlling pseudo load container for an insulated cold cabinet according to the first aspect, in which the temperature controlling pseudo load container comprises at least two arranging portions, one of which is for arranging a temperature controlling sensor and the other of which is for arranging a temperature recording.

A third aspect of the present invention is to provide the temperature controlling pseudo load container according to the first or the second aspect, in which the arranging portion comprises a recess provided on an external wall of the container and a cover for covering the recess.

A fourth aspect of the present invention is to provide the temperature controlling pseudo load container according to the first or the second aspect, in which the arranging portion comprises a hole extending inside the container, the hole enabling to receive the sensor.

A fifth aspect of the present invention is to provide a method for arranging the temperature controlling pseudo load container according to any one of the previous aspects to an insulated cold cabinet, in which the method comprises the step of arranging the temperature controlling pseudo load container by being fixed to a wall in the cabinet so as to be separated by a distance for avoiding the influence of heat conduction from the wall in the cabinet.

A sixth aspect of the present invention is to provide the method for arranging the temperature controlling pseudo load container to an insulated cold cabinet according to the fifth aspect, in which the sensor arranging portion is arranged so as not to face the wall in the cabinet.

A seventh aspect of the present invention is to provide an insulated cold cabinet comprising the above-mentioned temperature controlling pseude load container for controlling the inside temperature of the cold cabinet.

DETAILED DESCRIPTION OF THE PREFERRED EMBODIMENTS

Figure 1:
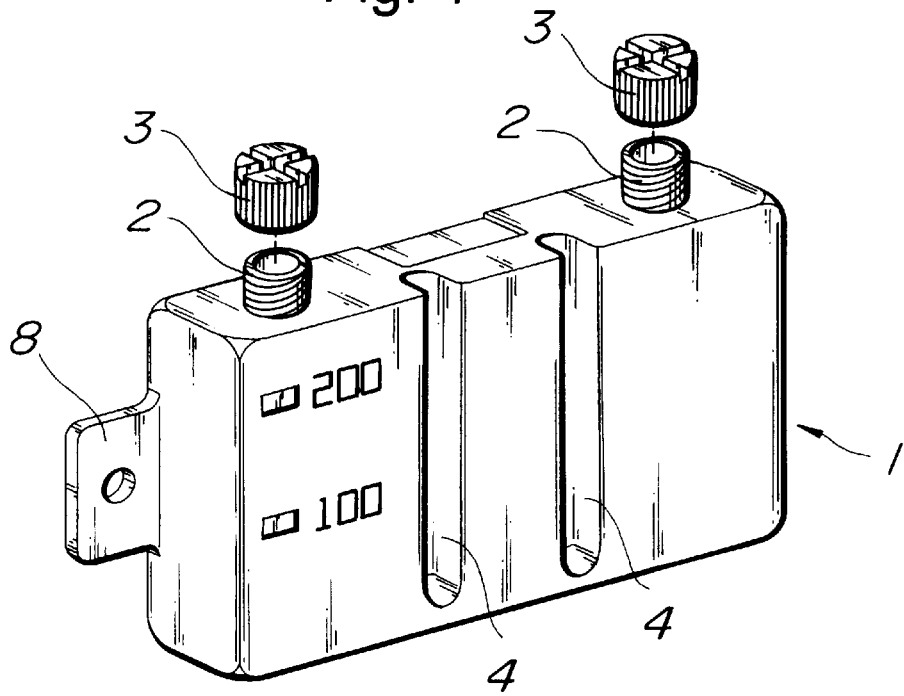
FIG. 1 is an explanatory diagram showing a temperature controlling pseudo load container according to the present invention.
Figure 2:
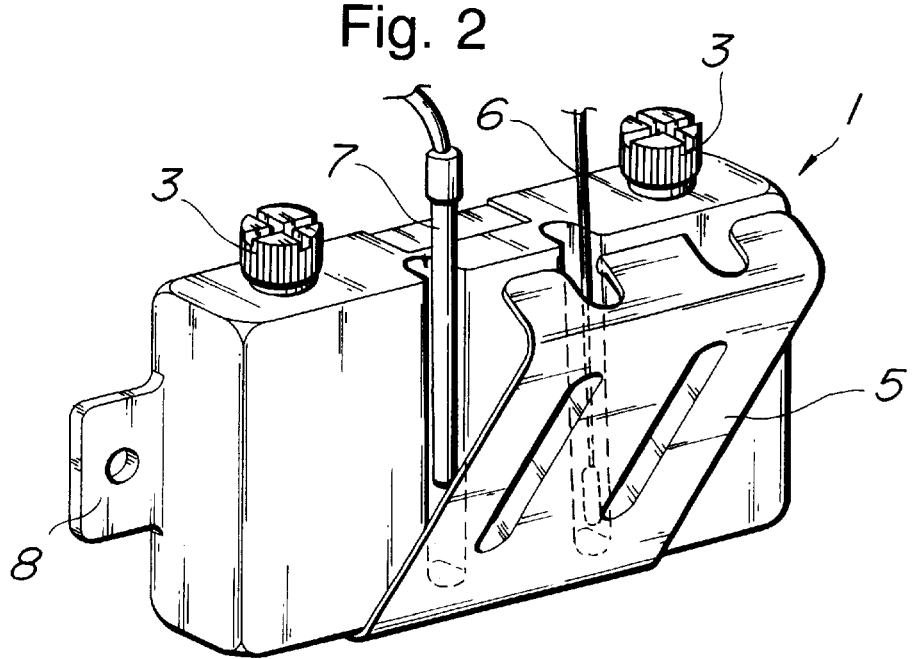
FIG. 2 is an explanatory diagram showing temperature control sensors and the like being mounted to the temperature controlling pseudo load container according to the present invention shown in FIG. 1.

Preferred embodiment of the present invention will be described with reference to the accompanying drawings.

The temperature controlling pseudo load container 1 of the present invention is, for example, a plastic container made by injection molding or blow molding. The material of the container 1 is preferably plastic, but not limited thereto. Materials relatively low in thermal conductivity may be used such as ceramic and glass.

Since the container 1 is arranged inside an insulated cold cabinet, it is preferably thin so as not to occupying a larger space. However, the shape of the container 1 is not limited to a particular shape, and may be in a circular or a triangular shape, for example.

The container 1 is provided with two opening portions 2 for inpouring water or physiological saline, and through the opening portions 2 water or physiological saline may be poured into the container. In filling water or physiological saline through one of the opening portions 2, the other opening portion 2 let the air out of the container, allowing easy pouring with no spill-out.

The opening portions 2 are provided with caps 3 which are screw threaded for sealing so that the water or physiological saline filled in the container 1 is prevented from spill-out or vaporization.

The container 1 comprises arranging portions for arranging sensors, composed of recesses 4 provided on an external wall of the container 1 and a cover 5 covering the recesses 4. One of the sensor arranging portions is an arranging portion for a temperature controlling sensor 6, and the other sensor arranging portion is an arranging portion for a temperature recording sensor 7. The temperature controlling sensor 6 and the temperature recording sensor 7 are inserted from above the container 1 into the recesses 4 to be mounted closely to the external wall surface of the container 1. The recesses 4 are covered with the cover 5 so that the respective sensors are fixed firmly and kept out of direct touch with the cold air in the cabinet. Designated by a reference numeral 8 is a mounting portion for arranging the container 1 inside the cabinet. The mounting portion 8 is formed integrally with the container 1.

A scale showing, for example, 100 cc and 200 cc is put on the surface of the container 1 to see the capacity of the content to be filled.

Figure 3:
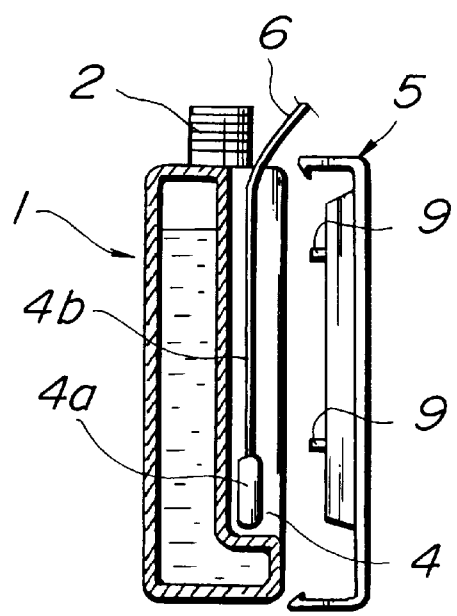
FIG. 3 is an explanatory diagram showing a side of the temperature controlling pseudo load container according to the present invention shown in FIG. 1.
Figure 4:
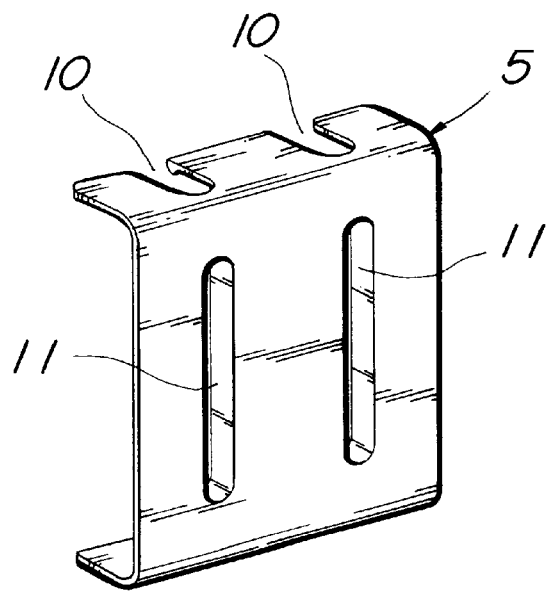
FIG. 4 is an explanatory diagram showing a cover of the temperature controlling pseudo load container according to the present invention shown in FIG. 1.

As shown in FIGS. 3 and 4, the temperature controlling sensor 6 and the temperature recording sensor 7 (not shown in FIG. 3) are inserted into the recesses 4, and the U-shaped cover 5 is fitted over the side wall of the container 1, so as to mount the sensors surely. In order to prevent the respective sensors from being drawn out, the cover 5 is provided with a plurality of beads 9 for support, which are configured to lock body portions 4a and lead lines 4b of the respective sensors. Designated by a reference numeral 10 are concave portions of the cover 5, and 11 are transparent windows of the cover 5 for confirming the sensors inside.

Figure 5:
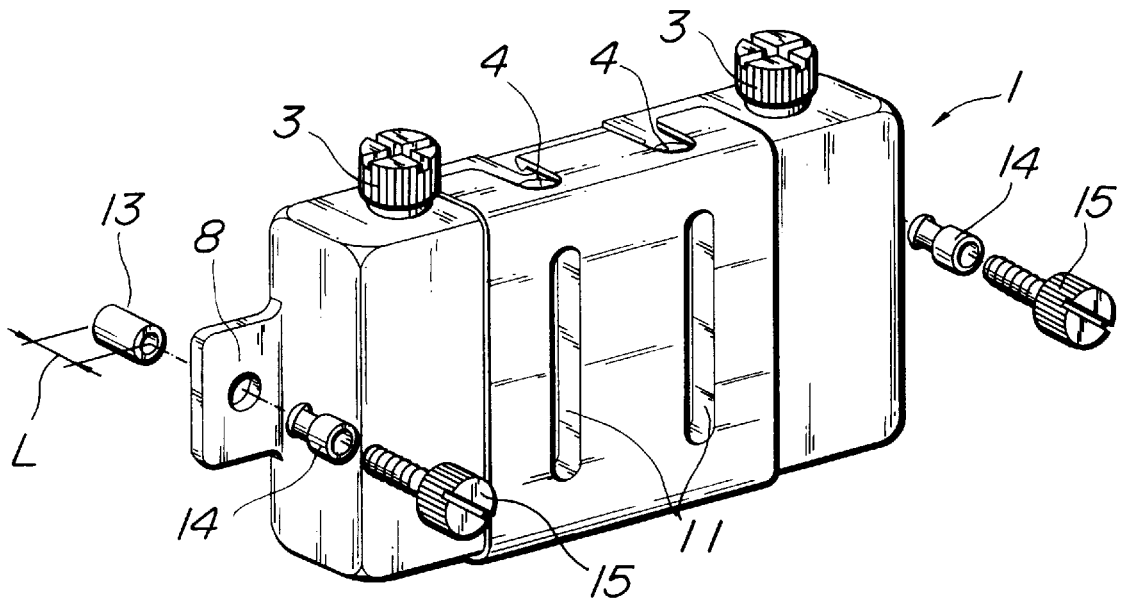
FIG. 5 is an explanatory diagram illustrating a method for arranging the temperature controlling pseudo load container according to the present invention shown in FIG. 1 inside an insulated cold cabinet.
Figure 6:
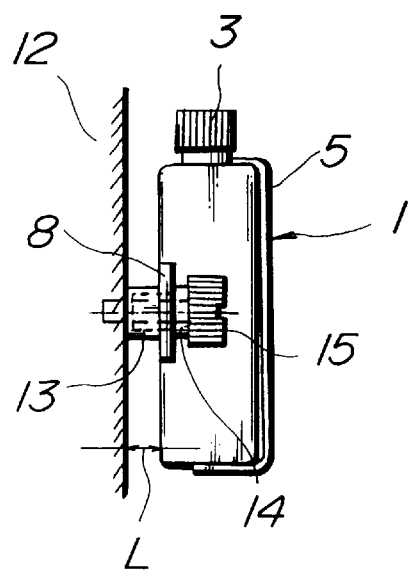
FIG. 6 is an explanatory diagram showing a cross-sectional view of the temperature controlling pseudo load container according to the present invention shown in FIG. 1 being arranged onto a wall in the cabinet.

FIGS. 5 and 6 shows a method for arranging a pseudo load container of the present invention inside a cabinet.

The pseudo load container 1 is preferably arranged so as to be fixed to a wall surface 12 of the cabinet, being separated from the wall of the cabinet by a distance L for avoiding the influence of heat conduction from the wall surface 12 in the cabinet. The distance L depends on such as type and size of the insulated cold cabinet and arranging position of the container in the cabinet. Therefore, the distance L is not limited to a particular distance, and may be determined freely. The container 1 is fixed to the wall surface 12 with bolts 15 via a spacer 13 of length L and another spacer 14 at the mounting portions 8 of the container 1, so as to be mounted in no touch with the wall surface 12 in the cabinet. In addition, the container 1 is mounted so that the sensor arranging portions composed of the recesses 4 and the cover 5 face away from the wall surface 12 for avoiding the influence of the heat conduction from the wall surface 12 in the cabinet.

Figure 7:
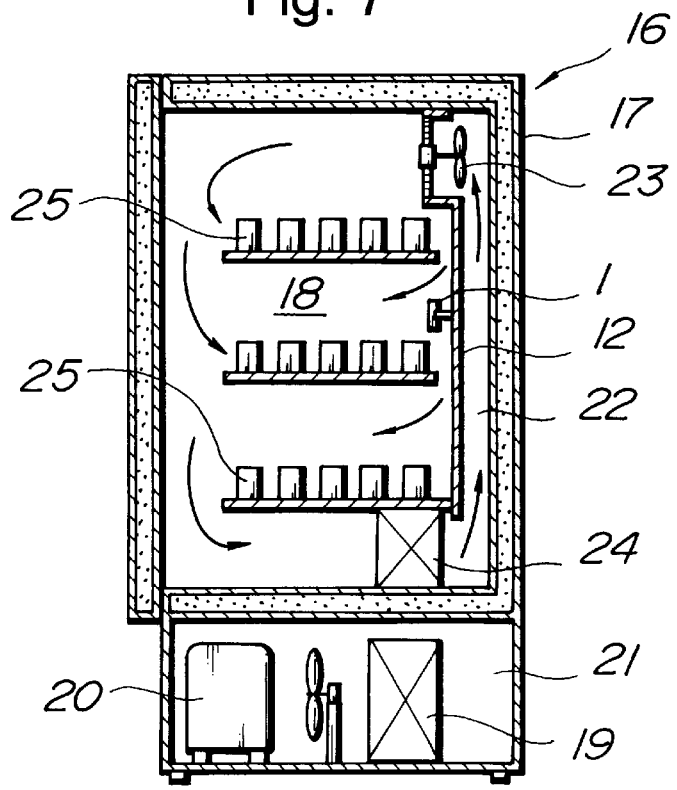
FIG. 7 is an explanatory diagram showing an insulated cold cabinet provided with a temperature controlling pseudo load container according to the present invention on a wall inside thereof.

FIG. 7 shows an embodiment of an insulated cold cabinet having a temperature controlling pseudo load container of the present invention inside. The insulated cold cabinet 16 is provided with an insulated cold cabinet body 17 thereof formed with heat insulating walls. A storage room 18 for storing blood, medicine, food, and the like is provided in the insulated cold cabinet body 17. A machine room 21 containing a condenser 19, a compressor 20 and the like is provided under the storage room 18, and a vertically-extending duct 22 is provided on the rear side of the storage room 18. A blowing fan 23 for circulating cold air is arranged on the upper part of the duct 22, and an evaporator 24 is mounted within the duct 22. The air cooled by the evaporator 24 is circulated as shown by arrowheaded full lines in the figure, thereby cooling the inside of the storage room 18. Designated by reference numerals 25 are containers containing, for example, blood.

The pseudo load container 1 of the present invention containing water or physiological saline is arranged to be fixed to the wall surface 12 in the cabinet, being separated from the wall surface 12 of the cabinet by a distance for avoiding the influence of the heat conduction from the inside wall surface 12. Signals from the temperature controlling sensor 6 mounted to the container 1 are transmitted to a control device (not shown) for temperature control.

The above-described configuration enables the temperature distribution of the loads inside the insulated cold cabinet 16 to fall within ±1.5° C., and the differential of the load of the blood inside the blood containers 25 to be controlled within ±1.0° C.

Figure 8:
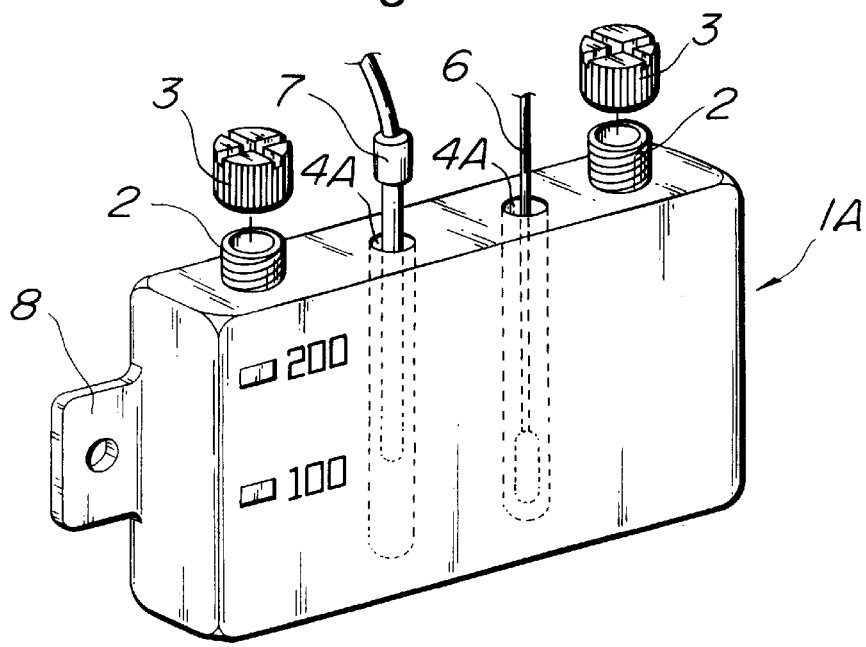
FIG. 8 is an explanatory diagram showing another temperature controlling pseudo load container according to the present invention.

FIG. 8 is an explanatory diagram showing another embodiment of the temperature controlling pseudo load container according to the present invention.

A temperature controlling pseudo load container 1A in the present embodiment according to the present invention is, for example, a plastic container formed by blow molding. The container 1A is provided with sensor arranging portions for a temperature controlling sensor 6 and a temperature recording sensor 7 in the form of holes 4A extending inside the container 1A downwardly from the top to the vicinity of the bottom. The container 1A is identical with the temperature controlling pseudo load container 1 in the previous embodiment according to the present invention shown in FIGS. 1–5 in that the temperature controlling sensor 6 and the temperature recording sensor 7 inserted into the respective sensor arranging portions are in no touch with the water or the physiological saline in the container 1A, excepting that the cover 5 is absent. The absence of the cover 5 reduces the number of components and lowers the cost.

An insulated cold cabinet using a temperature controlling pseudo load container according to the present invention is capable of controlling the inside temperature of the cabinet to agree with the load temperatures of actual blood, medicine, food, and the like, and meeting the international standard regarding the preservation of blood.

A temperature recording sensor as well as a temperature controlling sensor may be mounted to the temperature controlling pseudo load container according to the present invention to facilitate the recording of the actual temperature that is controlled so that the inside temperature of the cabinet agrees with the load temperature of actual blood and the like.

A sensor arranging portion is easily configured by providing a recess in an external wall of a temperature controlling pseudo load container according to the present invention and by applying a cover over the recess.

A temperature controlling pseudo load container of the present invention may be arranged by being fixed to a wall in the cabinet, being separated by a distance for avoiding the influence of heat conduction from the wall in the cabinet, to control to desired temperatures independently of the temperature of the wall in the cabinet.

A sensor arranging portion may be arranged so as not to face said wall in the cabinet to control to desired temperatures independently of the temperature of the wall in the cabinet.

It should be noted that the present invention is not limited to the aforesaid embodiments, and various modifications may be made thereto within the true spirit and scope of the appended claims.

What is claimed is:

1. A temperature controlling pseudo load container for an insulated cold cabinet, said temperature controlling pseudo load container being arranged in the insulated cold cabinet for controlling the inside temperature thereof and containing water or physiological saline, said temperature controlling pseudo load container comprising an opening portion for pouring water or physiological saline, said opening portion being sealable, and an arranging portion for arranging a sensor, said arranging portion being capable of mounting the sensor adjacently to an external wall of said container and preventing the sensor from direct touching with cold air in the cabinet.

2. The temperature controlling pseudo load container for an insulated cold cabinet according to claim 1, wherein said temperature controlling pseudo load container comprises at least two arranging portions, one of which is for arranging a temperature controlling sensor and the other of which is for arranging a temperature recording.

3. The temperature controlling pseudo load container according to claim 2, wherein said arranging portion comprises a recess provided on an external wall of the container and a cover for covering the recess.

4. The temperature controlling pseudo load container according to claim 2, wherein said arranging portion comprises a hole extending inside the container, said hole enabling to receive the sensor.

5. A method for arranging the temperature controlling pseudo load container according to claim 2 to an insulated cold cabinet, said method comprising the step of arranging said temperature controlling pseudo load container by being fixed to a wall in the cabinet so as to be separated by a distance for avoiding the influence of heat conduction from said wall in the cabinet.

6. The temperature controlling pseudo load container according to claim 1, wherein said arranging portion comprises a recess provided on an external wall of the container and a cover for covering the recess.

7. A method for arranging the temperature controlling pseudo load container according to claim 6, to an insulated cold cabinet, said method comprising the step of arranging said temperature controlling pseudo load container by being fixed to a wall in the cabinet so as to be separated by a distance for avoiding the influence of heat conduction from said wall in the cabinet.

8. The temperature controlling pseudo load container according to claim 1, wherein said arranging portion comprises a hole extending inside the container, said hole enabling to receive the sensor.

9. A method for arranging the temperature controlling pseudo load container according to claim 1 to an insulated cold cabinet, said method comprising the step of arranging said temperature controlling pseudo load container by being fixed to a wall in the cabinet so as to be separated by a distance for avoiding the influence of heat conduction from said wall in the cabinet.

10. The method for arranging the temperature controlling pseudo load container to an insulated cold cabinet according to claim 9, wherein said arranging portion for arranging the sensor is arranged so as not to face said wall in the cabinet.

11. An insulated cold cabinet comprising a temperature controlling pseude load container for controlling the inside temperature of the cold cabinet, said container containing water or physiological saline, said container comprising an opening portion for pouring water or physiological saline, said opening portion being sealable, and an arranging portion for arranging a sensor, said arranging portion being capable of mounting the sensor adjacently to an external wall of said container and preventing the sensor from direct touching with cold air in the cabinet.

12. The insulated cold cabinet according to claim 11, comprising an insulated cold cabinet body formed with heat insulating walls, said cabinet body comprising a storage room, a duct, an evaporator provided within the duct; a machine room provided with a condenser and a compressor; wherein said pseude load container is fixed to a wall of the storage room so as to be separated by a distance for avoiding the influence of heat conduction from said wall.

* * * * *